United States Patent
Aigner et al.

(10) Patent No.: US 8,069,437 B2
(45) Date of Patent: Nov. 29, 2011

(54) FRAMEWORK FOR A COMPOSITE APPLICATION AND A METHOD OF IMPLEMENTING A FRAME WORK FOR A COMPOSITE APPLICATION

(75) Inventors: Werner Aigner, Willmering (DE); Juergen Zimmermann, Horb (DE); Joerg Beringer, Frankfurt (DE)

(73) Assignee: SAP AG, Walldorf (DE)

(*) Notice: Subject to any disclaimer, the term of this patent is extended or adjusted under 35 U.S.C. 154(b) by 1385 days.

(21) Appl. No.: 10/550,446

(22) PCT Filed: Mar. 22, 2004

(86) PCT No.: PCT/EP2004/003047
§ 371 (c)(1),
(2), (4) Date: Oct. 12, 2006

(87) PCT Pub. No.: WO2004/083984
PCT Pub. Date: Sep. 30, 2004

(65) Prior Publication Data
US 2007/0033088 A1 Feb. 8, 2007

Related U.S. Application Data

(60) Provisional application No. 60/456,697, filed on Mar. 21, 2003.

(51) Int. Cl.
*G06F 9/44* (2006.01)

(52) U.S. Cl. ........ 717/109; 717/100; 717/106; 717/120; 717/121

(58) Field of Classification Search .......... 717/100, 717/106–109, 120, 121
See application file for complete search history.

(56) References Cited

U.S. PATENT DOCUMENTS 6,199,195 B1 * 3/2001 Goodwin et al. ............. 717/104
6,789,252 B1 * 9/2004 Burke et al. .................. 717/100

* cited by examiner

*Primary Examiner* — Wei Zhen
*Assistant Examiner* — Qing Chen
(74) *Attorney, Agent, or Firm* — Buckley, Maschoff & Talwalkar LLC

(57) ABSTRACT

Methods and apparatus, including computer program products, for a framework for composite applications. A computer-implemented framework for a composite application includes an object access layer to exchange data with enterprise base systems and to present the data to a composite application through a uniform interface, a business object modeling layer including a business object modeler to provide a user interface (UI) for constructing a business object, and a service layer to enable services to the composite application, the service layer including a collaboration services module to enable collaboration services to the composite application, the business object modeling layer linking at least one of the collaboration services associated with the business object to the business object.

11 Claims, 6 Drawing Sheets

FRAMEWORK FOR A COMPOSITE APPLICATION AND A METHOD OF IMPLEMENTING A FRAME WORK FOR A COMPOSITE APPLICATION

CROSS-REFERENCE TO RELATED APPLICATIONS

This application claims the benefit from International Application No. PCT/EP2004/003047, filed on 22 Mar. 2004, and U.S. Patent Application No. 60/456,697, filed on 21 Mar. 2003, the entire contents of which are incorporated herein by reference.

BACKGROUND

The present invention relates to data processing by digital computer, and more particularly to a framework for composite applications.

Integration platforms, such as the SAP Enterprise Portal for integrating heterogeneous information technology (IT) assets, can include a framework for a composite application, and use, among other things, object oriented programming (OOP), wherein objects, in particular business objects, are manipulated in business applications.

An integration platform such as the SAP Enterprise Portal enables generic services for collaboration with and/or between users, the services including, for example, subscriptions, rating, voting, discussion, comments and so forth. These generic services have evolved out of document-based content management systems. A problem with such services is that while they can be applicable to a particular business object, they are not necessarily directly applicable for other business objects. In particular, the generic services require customizing in order to be applicable to other business objects. For example, depending on a business context, a system-based conversation thread can be perceived by a user as a variety of processes, e.g., a decision making process, a brainstorming session, an evaluation, a negotiation, a coordination, an audit trail, and so forth. Generic services are unable to adapt to the actual work intent of the collaboration in terms of naming and function set.

SUMMARY

The present invention provides methods and apparatus, including computer program products, for a framework for composite applications.

In general, in one aspect, the invention features a computer-implemented framework for a composite application, the framework including an object access layer to exchange data with enterprise base systems and to present the data to a composite application through a uniform interface, a business object modeling layer including a business object modeler to provide a user interface (UI) for constructing a business object, and a service layer to enable services to the composite application, the service layer including a collaboration services module to enable collaboration services to the composite application, the business object modeling layer linking at least one of the collaboration services associated with the business object to the business object.

In embodiments, the collaboration services module can enable at least one generic collaboration service. The object modeling layer can include a module to derive at least one object specific service from the at least one generic collaboration service. A process modeler can be included including a context modeler for modeling a context, wherein the object modeling layer can include a module arranged to derive an object specific service from the at least one generic collaboration service on the basis of the modeled context. Each business object can be a specific instance of an object class, and the object modeling layer can include a module to extend the object class by adding a generic collaboration service and to derive an object class specific service from the at least one generic collaboration service.

The object modeling layer can specialize the at least one generic collaboration service in accordance with the object class. The object modeling layer can be included in a design time component.

The method can include a user interface (UI) layer to enable UI patterns that facilitate information exchange between the composite application and a user.

In another aspect, the invention features a computer-implemented method of implementing a composite application in a framework, the method including accessing an object to exchange data with enterprise base systems and to present the data to a composite application through a uniform interface, modeling a business object to enable a user interface (UI) for constructing a business object, and enabling services to the composite application including providing collaboration services to the composite application, the modeling can include directly linking at least one of the collaboration services associated with the business object to the business object.

In embodiments, providing the collaboration services can include enabling at least one generic collaboration service. Modeling can include deriving at least one object specific service from the at least one generic collaboration service. The method can include modeling a process including a context, the modeling including deriving an object specific service from the at least one generic collaboration service on the basis of the modeled context. Each business object can a specific instance of an object class, and modeling can include extending the object class by adding a generic collaboration service and deriving an object class specific service from the at least one generic collaboration service.

Modeling can include specializing the at least one generic collaboration service in accordance with the object class. The modeling can carried out by a design time component. The method can enable a UI layer to provide UI patterns that facilitate information exchange between the composite application and a user.

Other features and advantages of the invention are apparent from the following description, and from the claims.

DETAILED DESCRIPTION

The systems and techniques described here relate to a framework for developing and implementing applications in an enterprise management system. For example, a framework can be used to develop and implement a composite application, which overlays an enterprise IT platform and uses it to enable processes that are not the core enterprise transactional processes. That is, a composite application can orchestrate a business process in synchronization with existing processes, e.g., native processes of enterprise base systems, and leverage existing investments in the IT platform. Composite applications can be run on a heterogeneous IT platform. In doing so, composite applications can be cross-functional, i.e., they can drive business processes across different applications, technologies, and organizations. Composite applications can drive end-to-end business processes across heterogeneous systems.

Composite applications can be combined with each other in order to enlarge the process coverage. Composite applications can also support semi-structured processes, event-driven and knowledge-based scenarios, and support a high degree of collaboration in teams. In teams, for example, people can work on specific tasks in specific roles in specific teams. Composite applications can relate knowledge, structured information, and/or unstructured information within the context of a business process and can be triggered by events, aggregate and contextualize information, and drive collaboration and transactions. Different applications supported by different frameworks can have any combination of these characteristics. Thus, different implementations of the framework can be used for developing and implementing various types of applications.

Figure 1A:
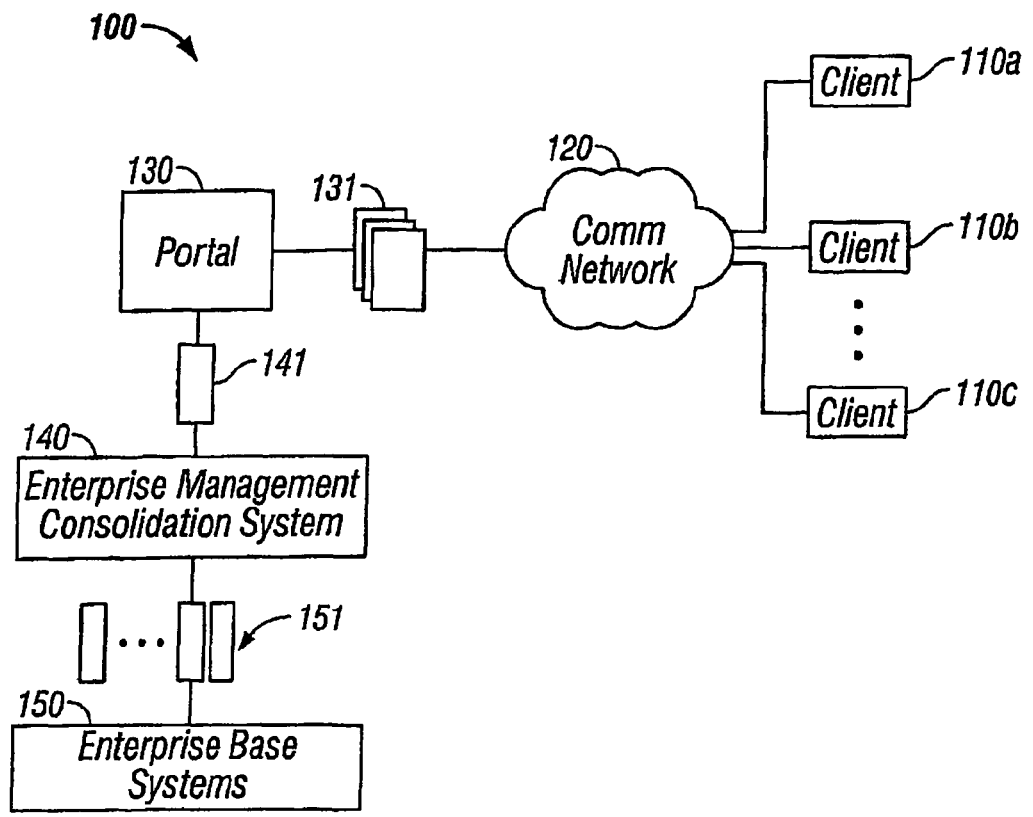
FIGS. 1A and 1B are block diagrams of an exemplary integrated platform.
Figure 1B:
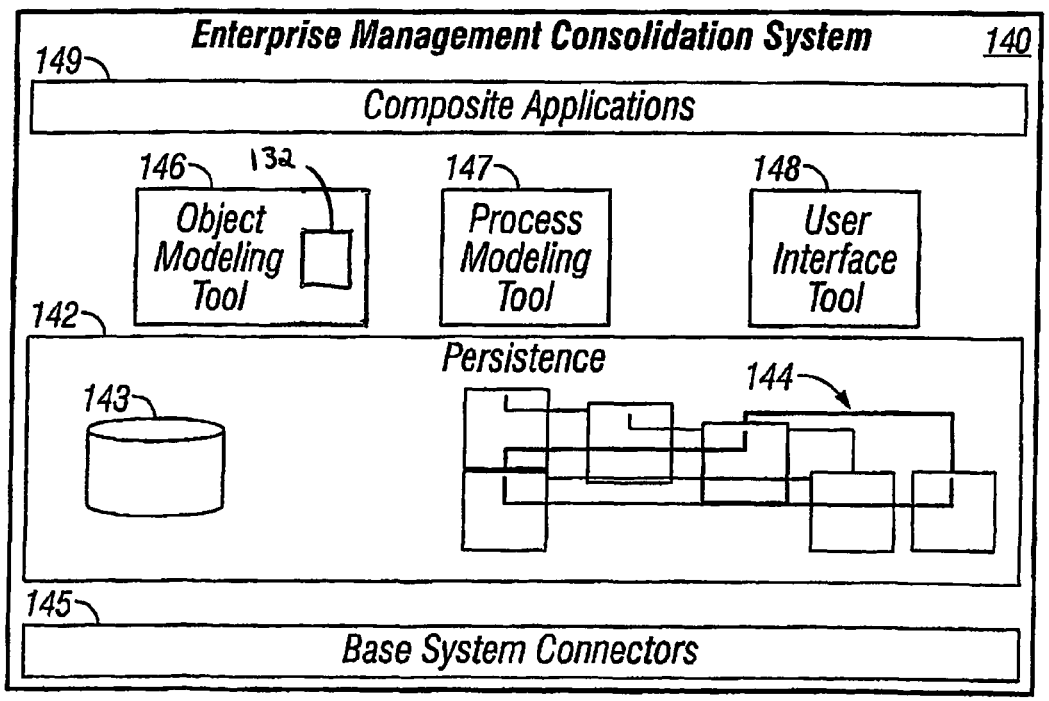

As shown in FIG. 1A and FIG. 1B, an exemplary integrated platform 100 is also referred to as integrated enterprise management system. Clients 110 access data over a communication network 120 through a portal 130. Network 120 can be any appropriate type of communication network, such as, for example, a local area network (LAN), a wide area network (WAN), an enterprise network, a virtual private network (VPN), the Internet, and/or a Public Switched Telephone Network (PSTN).

Clients 110 can be any machines or processes capable of communicating over network 120. In particular examples, clients 110 can be web browsers and can be coupled with network 120 through a proxy server.

Portal 130 provides a common interface to program management services. Portal 130 receives requests from clients 110 and generates information views 131, such as Web pages, in response. The portal 130 can implement a user-role based system to personalize a common interface and the information views 131 for a user of one of clients 110. A user can have one or more associated roles that allow personalized tailoring of a presented interface through the generated information views 131.

In an example, the portal 130 can include one or more service interfaces to an enterprise management consolidation system 140. The service interfaces can include an Internet Transaction Server (ITS) component, various connectors, such as a Java Connector, and a Business Intelligence platform.

Portal 130 communicates with enterprise management consolidation system 140, which consolidates multiple application services. Portal 130 receives information 141 from enterprise management consolidation system 140 for use in fulfilling the requests from clients 110. Enterprise management consolidation system 140 provides integrated application services to manage business objects and processes in a business enterprise. The business objects and processes can be resources (e.g., human resources), development projects, business programs, inventories, clients, accounts, business products, and/or business services.

Enterprise management consolidation system 140 communicates with enterprise base systems 150 to obtain multiple types of information 151. Enterprise base systems 150 can include various existing application services, such as customer relationship management (CRM) systems, human resources management (HRM) systems, financial management (FM) systems, project management (PM) systems, knowledge management (KM) systems (e.g., documents attached to a business object), business warehouse (BW) systems, time management (TM) systems, and/or electronic file and mail systems. The enterprise base systems can also include an integration tool, such as an exchange infrastructure (XI), which provides another level of integration among base systems.

Enterprise management consolidation system 140 can consolidate and integrate the data and functionality of enterprise base systems 150 into a single enterprise management tool. This enterprise management tool can include systems and techniques to facilitate creation and execution of new applications within the enterprise management consolidation system. These new applications can be composite applications and can readily draw on the resources of enterprise base systems 150 to cross over traditional enterprise application boundaries and to handle new business scenarios in a flexible and dynamic manner, allowing rapid and continuous innovation in business process management. A virtual business cycle can be created using such cross-functional applications, where executive-level business strategy can feed management-level operational planning, which can feed employee level execution, which can feed management-level evaluation, which can feed executive-level enterprise strategy. The information generated at each of these stages in the enterprise management cycle can be readily consolidated and presented by the enterprise management consolidation system 140 using customized composite applications. The stages can provide and consume determined services that can be integrated across multiple disparate platforms.

Portal 130, enterprise management consolidation system 140, and enterprise base systems 150 can reside in one or more programmable machines, which can communicate over a network or one or more communication buses. For example, base systems 150 can reside in multiple servers connected to an enterprise network, and portal 130 and enterprise management consolidation system 140 can reside in a server connected to a public network. Thus, system 100 can include customized, Web-based, composite applications, and a user of the system can access and manage enterprise programs and resources using these customized, Web-based, composite applications from anywhere that access to a public network is available.

As shown in FIG. 1B, enterprise management consolidation system 140 includes a persistence layer 142 and one or more base system connectors 145. Base system connectors 145 enable data exchange and integration with enterprise base systems. Base system connectors 145, for example, can include an Enterprise Connector (EC) interface, an Internet Communication Manager/Internet Communication Framework (ICM/ICF) interface, an Encapsulated PostScript@ (EPS) interface, and/or other interfaces that provide Remote Function Call (RFC) capability. Persistence layer 142 provides enterprise management consolidation system 140 with its own database 143 and data object model 144. Database 143 and object model 144 provide a consolidated knowledge base to support multiple enterprise management functions, such as portfolio management, project execution, risk assessment, budgeting, scheduling, workforce planning, skills management, business forecasting, and capacity modeling, which could all be could be created as composite applications 149. Data object model 144 can represent a subset of data objects managed by the base systems. That is, not all of the data aspects tracked in the base systems need to be recorded in data object model 144. Data object model 144 can have defined relationships with data objects stored in the base systems; for example, certain objects in data object model 144 can have read-only or read-write relationships with corresponding data objects in the base systems. These types of defined relationships can be enforced through the communication system built between persistence layer 142 and the base systems. Thus, persistence layer 142 can be used to effectively decouple application development and execution from the underlying base systems. Applications 149 take advantage of this decoupling from back-end systems to flexibly integrate existing systems and new functional components into business processes. The applications can drive business processes across different platforms, technologies, and organizations. Applications 149 can be created using a set of tools that enable efficient application development. The tools can enable efficient application development by providing application patterns that support model-driven composition of applications in a service-oriented architecture. An object modeling tool 146 enables creation of new business objects in the persistence layer 142 by providing a mechanism to extend data object model 144 dynamically according to the needs of an enterprise. The object modeling tool 146 includes a module 132 to derive at least one object specific service from at least one generic collaboration service. The module 132 further derives an object class specific service from at least one generic collaboration service. A process modeling tool 147 enables creation of new business work flow and ad hoc collaborative work flow. A user interface (UI) tool 148 provides UI patterns that can be used to link new objects and work flow together and generate standardized views into results generated by applications 149. Object modeling tool 146, process modeling tool 147, and UI tool 148, can be used to build the components of applications 149 to implement new enterprise management functions without requiring detailed coding activity.

Figure 5:
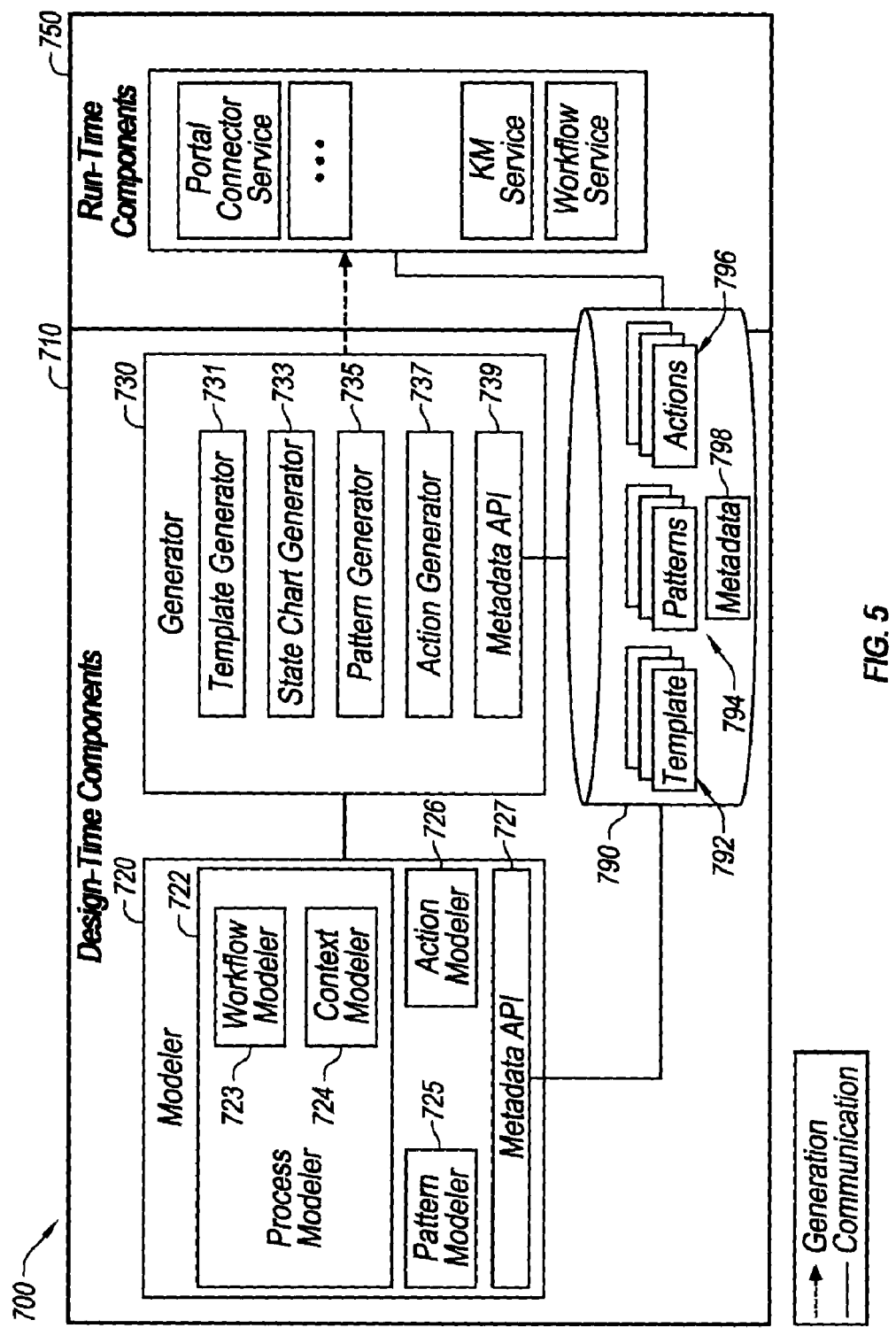
FIG. 5 is a block diagram of exemplary components for a guided procedure for a composite application framework.

Process modeling tool 147 can include guided procedure templates with pre-configured work procedures that reflect best practices of achieving a work objective that is part of a larger cross-functional application scenario. Such a work procedure can include contributions from several people, creation of multiple deliverables, and milestones/phases. Moreover, whenever an instantiated business object or work procedure has lifetime and status, the progress and status of the object or work procedure can be tracked by the process owner or by involved contributors using a dashboard that displays highly aggregated data. A dashboard and a page that provides access to status information about ongoing work, such as a personalized work place, can be two UI patterns that are provided by UI tool 148. There can be other UI personalizations. For example, if there is a concept of personalized items, such as, for example, objects, recent objects, related objects, or preferred objects, then an object picker UI pattern, provided by UI tool 148, can be included to let users pick their favorite object directly. Such objects can be used to determine the context using a context modeler, as shown in FIG. 5.

Composite application scenarios can provide related information to the user when possible, and some parts within a larger application scenario can define what kind of related information is to be offered. Heuristics can be used to identify such relatedness, such as: (1) information that is related to the user due to explicit collaborative relationships such as team/project membership or community membership; (2) information that is similar to a given business object in a semantic space based on text retrieval and extraction techniques; (3) recent objects/procedures of a user; (4) other people performing the same or similar activity (e.g., using same object or procedure template having the same work set); (5) instances of the same object class; (6) next abstract or next detailed class; (7) explicit relationships on the organizational or project structure; (8) proximity on the time scale; (9) information about the underlying business context; and/or (10) information about the people involved in a collaborative process.

Composite applications also can include generic functionality in the form of Control Center Pages that represent generic personal resources for each user. These can refer to the following pages where appropriate: (1) MyOngoingWork page: provides access to status information about on-going work of a user (on-going work can refer to the state of business objects as well as guided procedures); (2) MyDay page: lists today's time-based events that are assigned or related to a user; (3) MyMessageCenter page: displays pushed messages and work triggers using a universal inbox paradigm with user selected categorical filters; and/or (4) MyInfo: provides access to personal information collections (e.g., documents, business objects, contacts) including those located in shared folders of teams and communities of which the user is a member. The page can also provide targeted search in collaborative information spaces such as team rooms, department home pages, project resource pages, community sites, and/or personal guru pages.

Figure 2:
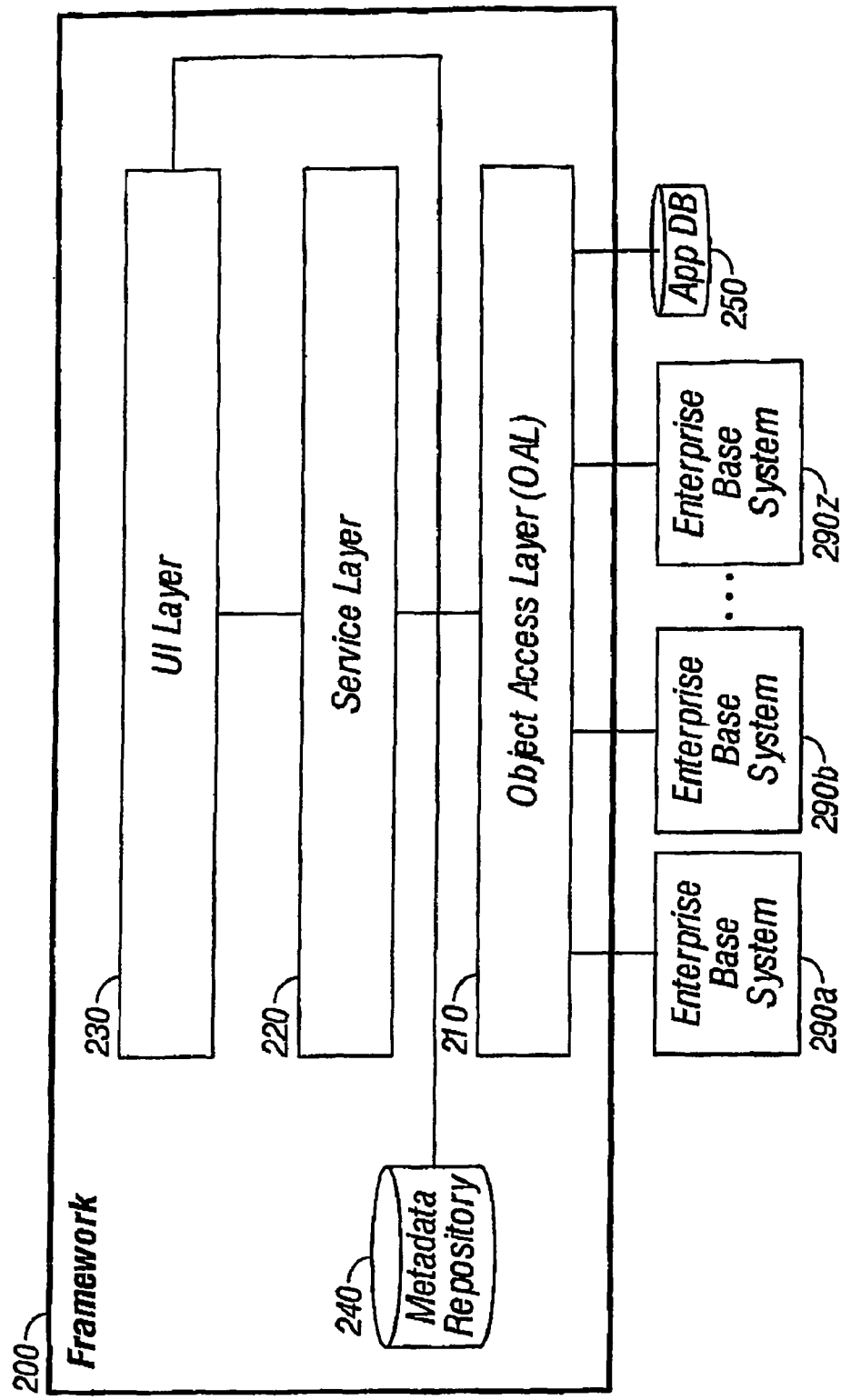
FIG. 2 is a block diagram illustrating an example framework for a composite application.

As shown in FIG. 2, a framework 200 for a composite application leverages and enhances underlying enterprise base systems 290, which could include an XI, supporting business transaction systems such as CRM, HCM, and PLM, Knowledge Management Warehouse (KW), and BW, with tools, content, and guidelines to provide a foundation for developing and executing composite applications.

Composite applications typically implement new or additional processes, as opposed to the core transactional processes, in an existing IT landscape. Composite applications can also support semi-structured processes, event-driven and knowledge-based business scenarios, and support collaboration in teams. In specific examples, composite applications can support the Java stack.

Framework 200 includes an object access layer (OAL) 210, a service layer 220, a user interface (UI) layer 230, and a metadata repository 240. OAL 210 manages interaction between composite applications and enterprise base systems 290. In doing so, OAL 210 provides a uniform interface for composite applications. Thus, OAL 210 reduces the knowledge needed for a composite application developer about the source of data because OAL 210 sits on top of and embraces different connectivity technologies. Coding and configuration data for OAL can be automatically generated, at least in part, by business object metadata in repository 240. Furthermore, OAL 210 allows for local persistency (e.g., connectivity to a local database such as an application database 250 to store data). Data synchronization and replication of remote data (e.g., data in back-end systems) into the local persistency database can be supported. For an application sitting on layer 210, the source of the data can be completely transparent, which can assist in keeping application logic stable since the application is, at least for the most part, not affected by underlying systems. In some examples, OAL 210 includes extensions to document management or content management that allow business objects to use the functionality for documents.

Service layer 220 provides services for business objects in layer 210. In general, services for business objects are common procedures that users need to interact effectively with the objects. Service layer 220, for example, can include generic services including generic collaboration services, guided procedure services, and/or a container for application services. By separating the services from the business objects, the services can be more readily reused across business objects.

In one particular example, object specific collaboration services are derived in the object modeling layer 146, 410, UI layer 230 provides user interfaces that allow a user to interact with composite applications. In other examples, UI layer 230 provides pattern components, such as, for example, a dashboard, a search bar, a browse and collect function, an object editor, and phases for a guided procedure, as building blocks for UIs. UI layer 230 can also decouple application logic from the UI. As shown, UI layer 230 accomplishes this by having a separation of the business objects, which are in the object access layer 210, and application services, which are in service layer 220, from the user interface elements, which are in UI layer 230. This allows UI components to be reused in different application contexts. This also allows business objects and application services to be visualized differently according to the specific equipments of a certain use case. UI layer 230 can also leverage the metadata information on business objects and services through metadata-driven UI-generation and configuration. The metadata approach allows for ready adaptability to alternative screens depending on the end users needs (e.g., in different industries).

UI layer 230 can additionally allow integration (e.g., binding) into OAL 210 to access business objects, business services, and metadata. Thus, UI components can be connected to business objects in OAL 210. UI layer 230 can support any appropriate type of UI, such as, for example, a user interface composed of pattern based components and/or freestyle components with interfaces to the user interface 25 components—this user interface will discussed in more detail below—or Java Server Pages (JSPs) from Sun Java Server Pages (JSPs) from Sun. Metadata repository 240 stores the content of the composite application (e.g., specific business objects, information about services, and, eventually, processes) and makes the metadata information available at run-time, if needed. The repository can allow different metamodels to be created (the model for business objects being one of them) and to persist the metadata.

Attached to framework 200 is application database 250. Database 250 provides a central repository for available business objects. An example of data in repository 250 includes database tables for a business object. The data may be added to, changed, and/or deleted. Data can also be stored in KW, BW, or an XI system. Framework 200 includes a set of standard services that enables application developers to make use of the data. In one example, specific services are directly linked to a particular business object in accordance, for example, with the context as modeled by context modeler 724, shown in FIG. 5. Based on the central repository for objects, metadata data about objects is stored in metadata repository 240. This metadata enables generic services like automatic generation of default UIs, object access interface, data access methods, persistency, and mappings.

Framework 200 can be implemented using readily available technology. For example, the framework can be implemented using mySAP technology components from SAP AG. In examples, the components can include an SAP Web Application Server (WAS) to run the applications, an SAP Enterprise Portal to render the applications, an SAP KW to handle unstructured information sources, pattern-based components and/or freestyle components with interfaces to the UI components to design Ms and to provide J2EE and ABAP runtime integration, an SAP BW to provide reporting and analytics, data mining, and planning and simulation, SAP Business Process Management (BPM), an SAP Exchange Infrastructure (XI) to provide shared integration knowledge separate from applications, and SAP Web services to offer business functionality over the Internet.

Framework 200 allows composite applications in which object specific collaboration services are provided to work with existing system landscapes. The framework accomplishes this by decoupling composite applications from the underlying enterprise platform, which includes enterprise base systems and deriving and linking at the object modeling layer 146, 410 specific services to business objects. This decoupling can involve providing communication to back-end systems via a central interface and providing a back-end-independent object model. The latter can be implemented so that the data from the source systems can be transformed into a unified structure.

Examples of the types of business processes supported by the framework 200 include, for example, product innovation including submitting a new idea, concept development, employee productivity, enterprise change management and enterprise service automation. Enterprise change management can support enterprises when merging, splitting, acquiring, spinning off, or reorganizing. Product innovation can support the life cycle of a product, including the prenatal phase of collecting ideas and consolidating them into concepts, the market launch phase, and the end of life. In doing so, the resources of a PLM and CRM can be drawn upon. Employee productivity aims to increase employee productivity, decrease costs, and increase employee satisfaction. Key functions can include manager self services, employee self services, expert finders, e-procurement, and e-learning. ERM and B2E resources can be drawn upon to accomplish these tasks. Enterprise service automation provides administration and monitoring functions as well as evaluation tools to facilitate project success. An example of this is setting up of projects and staffing with people with the required skills and availability. Additional application families can also be created.

Figure 3:
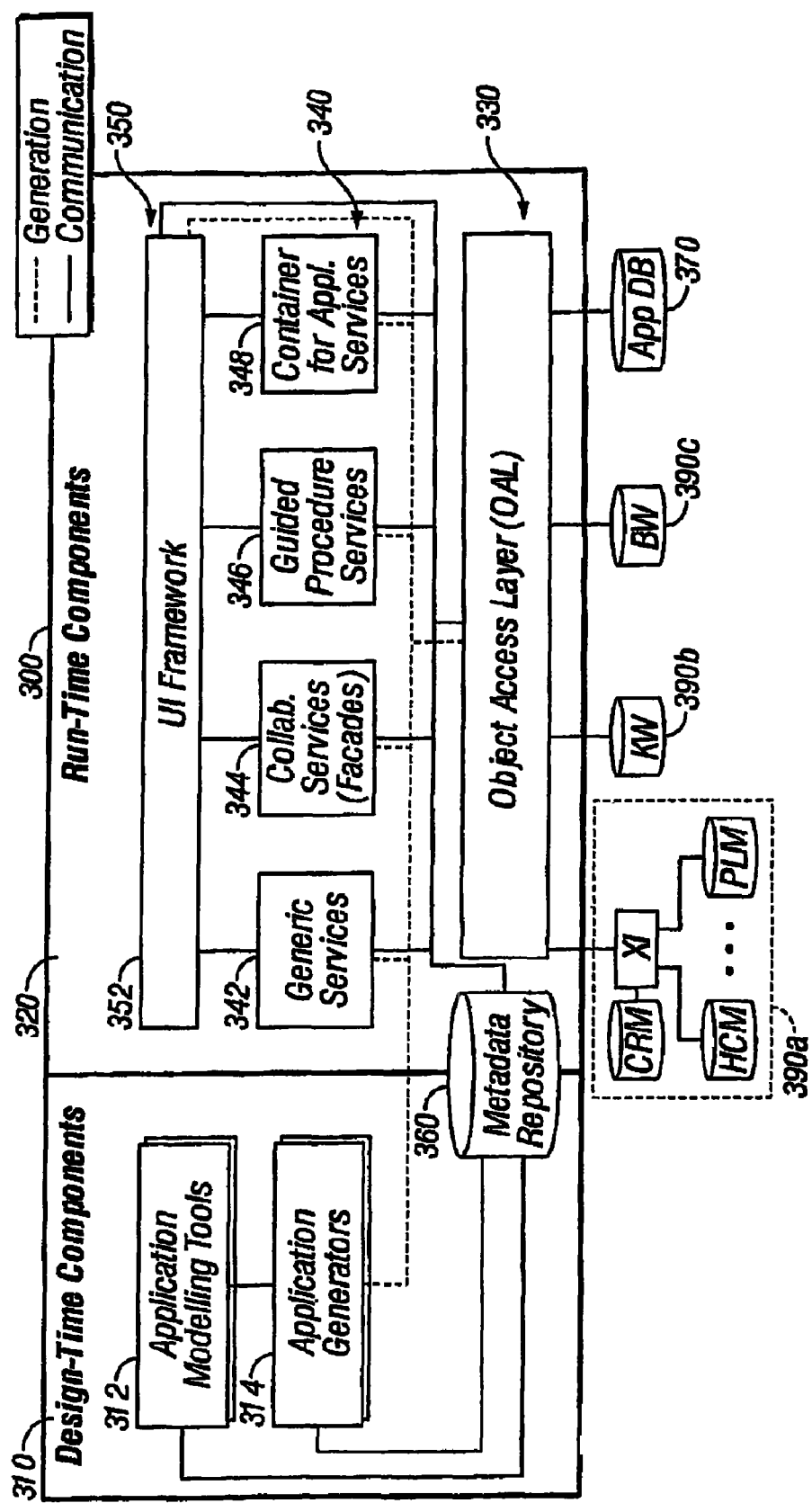
FIG. 3 is block diagram of an exemplary framework for a composite application.

As shown in FIG. 3, an exemplary composite application framework 300 includes design-time components 310, run-time components 320, and a metadata repository 360, which is shared by the design-time components and the run-time components. In general, design-time components 310 are responsible for developing composite applications that are executed by run-time components 320. Design time components include, for example, the object modeling layer 146, 410 including the object modeler.

Design-time components 310 provide a repository and UI for modeling and generating business objects, business services, business processes, UIs, and/or any other appropriate portions of a composite application. A business object, for example, can be an employee, a product, a plant, or any other semantic representation of a real-world entity. A business service is an action taken on a business object. Changing the price or category of a product are examples of services for a business object that represents a product. As another example, gathering input from employees and customers, who can themselves be represented by business objects, for a new product idea are examples of business services. Putting services together in a proper combination produces a business process. A composite application is typically composed of business objects, business services, and/or business processes.

Design-time components 310 include application modeling tools 312, application generators 314, and, in part, metadata repository 360. Modeling tools 312 can be used for modeling business objects, business services, business processes, user interfaces, and the like. A separate modeling tool can be used for each of the composite application portions. Modeling tools 312 can be used for integrating business objects, business services, business processes, UIs, and the like. Thus, framework 300 can support model-driven composition of composite applications, allowing for development with little or no programming effort. The metadata about business objects, business services, business processes, and/or other application portions is stored in metadata repository 360. Thus, an application portion can be modeled as well as the origin of the data, whether in a local database, remote database, or mixture. Generators 314 are used for generating actual code from the portions modeled by modeling tools 312. To accomplish this, the generators can use templates that are stored in metadata repository 360. Driven by the metadata in repository 360, the generators can automatically create Java classes (e.g., for use in run-time components 320) and also configuration files (e.g., to adjust UI patterns to a certain business object). Thus, the connectivity to back-end systems and the application persistency can be generated, as well as a default user interface. The generators can also generate interfaces for application services, data access logic, and persistency.

Run-time components 320 provide the run-time environment for business objects, business services, business processes, user interfaces, and the like, as well as data access abstraction. As illustrated, run-time components 320 include an object access layer 330, a service layer 340, a UI layer 350, and, in part, metadata repository 360. Run-time components 320 also use an application database 370, which stores data tables for executing applications.

Object access layer 330 manages interaction between composite applications and enterprise base systems 390. In doing so, layer 330 reduces the knowledge needed for the application developer about the source of data because layer 330 sits on top of and embraces different connectivity technologies. Thus, layer 330 provides a uniform interface for composite applications. As such, layer 330 can act as a dispatcher to provide access to a variety of data sources. Layer 330 leverages a message-based platform 390a that includes an XI with connectivity to underlying applications like CRM, HCM, and PLM, a knowledge management warehouse (KW) 390b, and a business intelligence warehouse (BW) 390c, and manages the persistency in application database 370. For data access abstraction, the fact that layer 330 sits on top of and embraces different connectivity technologies allows routing to a variety of different data sources. Furthermore, layer 330 allows for local persistency (e.g., connectivity to a local database such as application database 370 to store data). Additionally, data synchronization and replication of remote data (e.g., data in backend systems) into the local persistency database can be supported. The data can be transferred and transformed into the local persistency. For an application sitting on top of layer 330, the source of the data can be completely transparent. For example, some applications underlying layer 330 might provide services (e.g., Web services), allowing the data to be read remotely, and some applications can not provide such access.

In particular examples, layer 330 includes extensions to document management or content management that allow business objects to use the functionality for documents. For example, taxonomies for business objects, transparent indexing of TREX for structured and unstructured objects, and subscription services for dependent objects independent of the repository where the objects reside can be provided. Layer 330 can also provide transaction support, in as far as the transaction concept is also supported by concerned source systems, a metadata interface, allowing an application to be dynamically configured at run-time, and subscription services (e.g., J2EE publish and subscribe). Layer 330 can facilitate application building by configuration. This can be accomplished by providing standard interfaces with well-defined semantics, which allows components to be combined in a meaningful way and allowing objects to participate in a collaborative context, (e.g., chat room) by implementing certain interfaces. Service layer 340 provides services for business objects in layer 330. In general, services for business objects are common procedures that users need to interact effectively with the objects. A service layer can also provide other types of services, such as, for example, U-related service and/or collaboration services. Furthermore, the service layer can provide integration of external services.

Service layer 340 includes generic services 342, collaboration services 344, guided procedure services 346, and a container for application services 348. By separating the services from the business objects, the services can be more readily reused across business objects. Generic services 342 provide a set of standard services for parts of an application. The services can be used across applications. Generic services 342 can also provide Namespace and packaging concepts. The services are typically not bound to a portion of an application, but are available to all portions. Examples of generic services include print services, value help services, authorization, personalization, and voice enablement. An example of a value help service is the filling of drop down boxes in UIs; the service is able to determine what the possible entries are for boxes and to populate the boxes therewith.

Collaboration services 344 provides the ability to link semantic objects to business objects. Semantic objects typically provide a set of generic services, like classification, notification, subscription, feedback, search, retrieval, rating, time-based publishing, state-based publishing, and security model. In addition, relations between semantic objects can be supported. For example, a team could be assigned to a task, and people could be assigned to the team. Moreover, a room could be created for that task, to keep people and documents together. Semantic objects such as document, folder, room, task, meeting, user, and discussion can be accessible via layer 330. Semantic objects can also be available in a variety of other ways. For example, semantic objects can be included in layer 330 as business objects, and/or individual services of semantic objects can be included in layer 340.

Collaboration services 344 extend the semantic object concept by making the functionality of semantic objects available for business objects (e.g., notification, subscription, etc.). Thus, services 344 provides collaboration context for a business object. Services 344 can automatically manage the relations between business objects and semantic objects. In addition, new kinds of relations can be supported, e.g., relations between business objects and semantic objects. Thus, a task or a team can be assigned to a specific product, people can be assigned to the task, and so forth. Special collaborative services can be provided for semantic objects, such as scheduling and assignment functions for tasks and inviting, splitting, and closing functions for discussions. In particular implementations, a suite of collaboration services can be provided without the need to deal with KM specific. These services can also be made available for composition applications. The relation between the business objects and the semantic objects can be maintained.

The collaboration provided by collaboration services 344 can be semi-structured processes. A common understanding of a business process can be reflected by a predefined collaboration scenario. On the other hand, the business process can be adaptable to different enterprise's needs. To support this, differing scenarios can be built with minimal programming.

In a specific example, collaboration services are directly linked in the object modeling layer to business objects. Further, the object modeling layer includes a module 132 to derive object specific services from generic collaboration services. Each business object is a specific instance of an object class. Module 132 can extend the object class by adding a generic collaboration service and operable to derive an object class specific service from at least one generic collaboration service. For example, with the composite application framework (CAF), business objects are modeled. Besides the modeling of the business object data structure and core life cycle services such as "create," "edit," "delete," the object designer, for example, the user, can assign pre-configured or tailored collaboration services to the business object that represent best practice collaboration scenarios around the particular object. Such pre-configured or tailored services can be derivatives of generic collaboration services, such as "feedback," "rating," "voting," "discussion," "comments," and so forth. A derivative of a generic collaboration service is a generic collaboration service wherein a more specific functionality of the service has been derived. Such pre-configured can be Guided Procedure templates that represent more complex work procedures. Further, such pre-configured or tailored collaboration services can include simple collaborative actions that represent one-step ad hoc people-to-people coordination patterns.

For example, on the business object "Product Concept," the object designer can attach an "Innovation Talk" collaboration service derived from the generic service "discussion thread," or a "plus/minus rating" service derived from the generic collaboration service "voting". For the business object "customer," the object modeling layer, the object modeler can associate the Guided Procedure template "investigate financial solvency". For the business object: "Sales Process," the object modeling layer is arranged to link the ad hoc service "Request for Payment (RFP)."

For the collaboration service "subscription," the object modeler can predefine events that are exposed to the end user for subscription. In a sales process this can be "Notify me when new competitive situation arises" or "When scope of sales processes changes".

All or at least some of the collaboration services can be defined on a meta data level using logical services and data schemes to allow the connection to any engine that provides such collaboration services. In one example, this is achieved by a meta data modeler that maps between the web service proxies and the generic collaboration services and looks up target system addresses flexibly in the system landscape directory. In this manner, collaboration services and business applications are integrated. In particular, by providing collaboration services on top of business applications. The expression "collaboration service" can, also be referred to as "collaborative service," "collaboration process," or "collaborative process" and the like.

Guided procedure services 346 allow business objects to participate in guided procedures. A guided procedure is a series of steps, often involving human interaction, that should be performed during the execution of a composite application. A guided procedure, which is a type of workflow, is typically one that is common to a variety of applications and, thus, can be reused. To provide guided procedures, services 346 can provide pre-defined building blocks for process workflow and pre-defined actions.

Application services container 348 is used to implement model specific services for one or more business applications. Although generic objects, generic services, and/or processes can be generated for an application, some business logic is too specific to be implemented generically.

UI layer 350 includes a UI framework 352. Framework 352 provides pattern components as building blocks for user interfaces. Examples of pattern components include a dashboard, a search bar, a browse and collect function, an object editor, and phases for a guided procedure. These components can serve to increase efficiency of UI development because they are reusable and can serve to keep training costs down by providing a standard "look and feel" for the composite applications. Furthermore, the components provide a UI for composite application objects and services and allow a default UI to be automatically generated for displaying, creating, and changing business objects.

Framework 352 can also decouple application logic from the UL; framework 352 has a separation of the business objects and application services from the user interface elements. This allows UI components to be reused in different application contexts. This also allows business objects and application services to be visualized differently according to the specific equipments of a certain use case.

UI framework 352 can also leverage the metadata information on business objects and services through metadata-driven UI-generation and configuration. The metadata approach allows for ready adaptability to alternative screens depending on the end users needs (e.g., in different industries). UI framework 352 can additionally allow integration (e.g., binding) into layer 330 to access business objects, business services, and metadata. Thus, UI components such as patterns and freestyle can be connected to business objects in layer 330. In accomplishing this, framework 352 can provide the necessary metadata at design-time and manage the access to the according service providers at run-time.

UI framework 352 can support any appropriate type of user interfaces. For example, the UI framework can support a UI interface composed of pattern-based components and/or freestyle components with interfaces to the UI components or Java Server Pages (JSPs) from Sun Microsystems. UI framework 352 can also support a Java front-end and ABAP back-end, a Java front-end and Java back-end, or any other appropriate combination of front-end and back-end. The framework can additionally provide a construction kit for complex components and applications and configuration of patterns via XML, URL, or other appropriate technique.

Metadata repository 360 stores the content of the composite application (e.g., specific business objects, information about services, and, eventually, processes) and makes the metadata information available at run-time, if needed. The repository can allow different metamodels to be created (the model for business objects being one of them) and to persist the metadata. For specific purposes, additional repositories, such as, for example, a portal content directory (PCD), which can contain portal specific pieces of an application (e.g., views, pages, roles), can be required.

Attached to framework 320 is an application database 370. Database 370 provides a central repository for available business objects. An example of data in repository 370 includes database tables for a business object. The data may be added to, changed, and/or deleted. Data can also be stored in KW, BW, or an XI system. Based on the central repository for objects, metadata data about objects is stored in metadata repository 360. This metadata enables generic services like automatic generation of default UIs, object access interface, data access methods, persistency, and mappings.

In particular examples, modelers 312 and generators 314 generate the business objects used in layer 330. Modelers 312 and generators 314 also facilitate the creation of business object metadata and its storage in metadata repository 360. The modelers and generators can be relatively easy to use because they are restricted to a particular purpose. Additionally, they can help to ensure the consistency of the metadata according to the capabilities of layer 330.

In particular examples, the composite application portions can be implemented as Enterprise Java Beans (EJBs). In other examples, the design-time components can have the ability to generate the run-time implementation into different platforms, such as J2EE, ABAP, or .NET. Components 310 can also support a variety of specific features needed for business objects, such as time-dependent attributes or organizational-unit-dependent attributes, like product attributes, which differ from plant to plant. The components can not only generate the classes and the coding, but can also create the database tables and the interfaces to the UI, including the relevant metadata. So, after modeling, there can be a generation step that provides a stack of services for one business object, including the UI down to the database tables and proxies for remote access.

Framework 300 can be implemented similar to framework 200. In one example, an SAP WAS can include a J2EE engine, SAP IDE, Universal Workflow, and Deployment Service. The WAS can also include a pattern-based and freestyle-based user interface development and interface module. Also, an SAP Enterprise Portal may provide unified access to applications, information, and services by using views, roles, pages, worksets, top-level navigation, and KM. This enterprise portal also provides login management and user management. For KM, unstructured information includes collaboration and content management. For collaboration, KM enables team-driven business processes, synchronous and asynchronous applications, groupware integration, calendars, bulletin boards, threaded discussions, and collaboration rooms. For content management, KM handles documents, feedback, rating, publishing, subscription, document workflow, versioning, archiving, indexing, searching, and taxonomies. SAP BPM can cover life cycles (e.g., design, development, deployment, and change). An SAP XI can provide external and internal integration of system and connectors to various systems such as Oracle, Siebel, Peoplesoft, and SAP. The SAP XI can be based on Web services, JAVA, and XML standards. SAP Web services can provide a service provider, service handler, and service user. Additionally, an SAP BW can be used.

Moreover, the KM and collaboration functionality can embedded in applications, not only in separate pages in the portal. Furthermore, any general development environment can be used. For example, the development environment could include Java, with EJB 2.0, JDO, Java persistency, and Java application logic, Advanced Business Application Programming (ABAP), and Web services. Existing ABAP components can be integrated via Java connector calls. In particular examples, the complete Java stack is used. Furthermore, Web service technology can be used for remote access.

Framework 300 enables composite applications to work with existing system landscapes. The framework accomplishes this by decoupling composite applications from the underlying enterprise platform. This decoupling can involve providing communication to back-end systems via a central interface and providing a back-end-independent object model. The latter can be implemented so that the data from the source systems can be transformed into a unified structure. This can also enable successive installation, activation, and use of different applications, which can reduce entry costs. Examples of the types of business processes supported by the framework 300 include those supported by framework 200.

Figure 4:
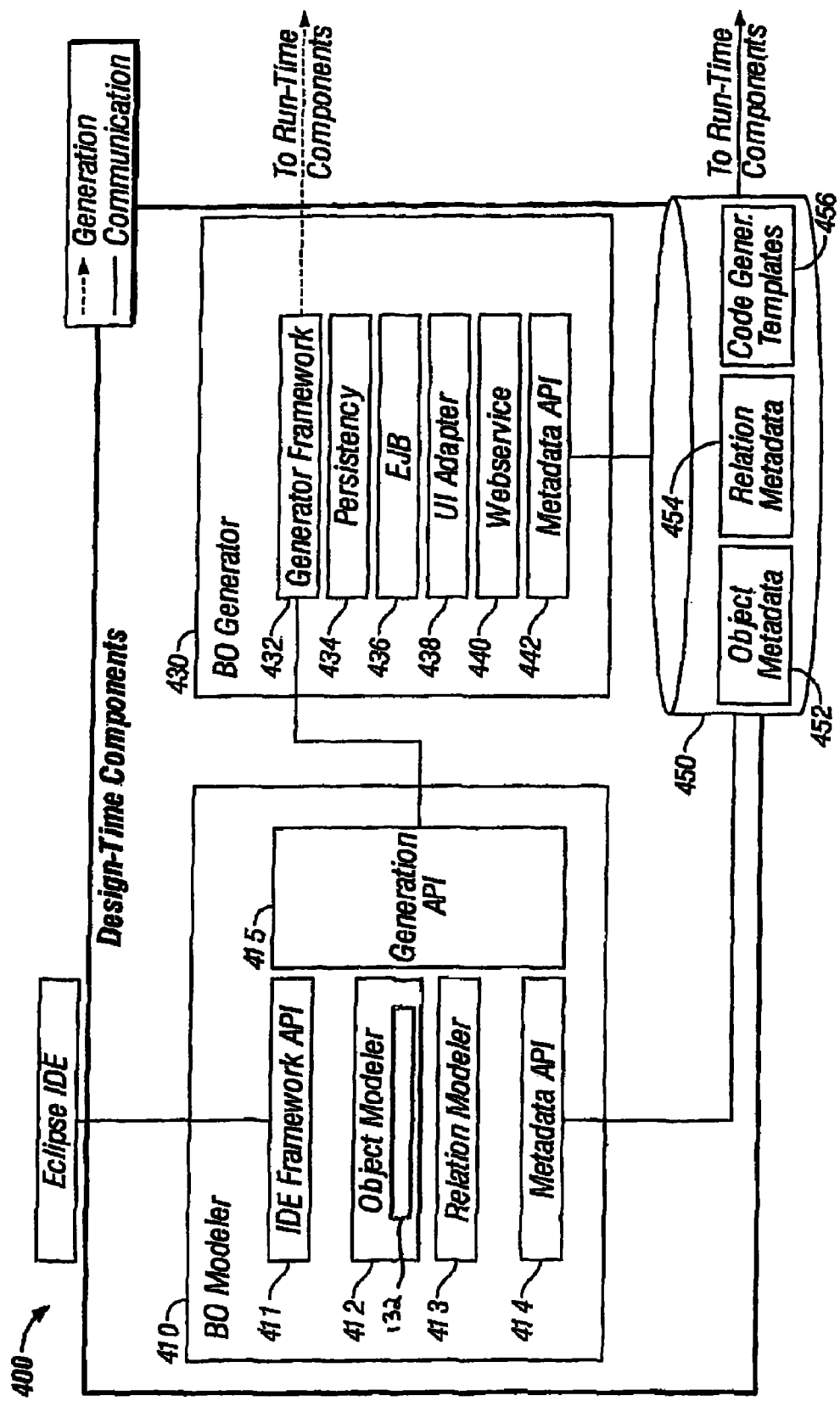
FIG. 4 is a block diagram of exemplary design-time components for a composite application framework.

As shown in FIG. 4, design-time components 400 for a composite application framework can be representative of design-time components 310 and include a business object modeler 410, a business object generator 430, and a metadata repository 450. Metadata repository 450 is also a run-time component. Business object modeler 410 includes—an Integrated Development Environment (IDE) application program interface (API) 411, an object modeler 412, and a relation modeler 413. IDE API 412 allows modeler 412 to be integrated into an Eclipse IDE, which supports the modeling of the business object by object modeler 412. For example, the integration supports generation of business objects as EJBs, interfaces for application services, default user interfaces, data access logic, and persistency.

Relation modeler 413 enables the modeling of relations between modeled objects. For example, a sales order can be composed of a customer, a product, and a price. Relation modeler 413, therefore, enables the modeling of the relations between these items. If a UI is generated for a sales order, the semantics for each field in the sales order can be identified. Additionally, a connection to the value help function can be facilitated.

Modeler 410 also includes a metadata API 414 and a generation API 415. Metadata API 414 enables object modeler 412 to store and access business object metadata in metadata repository 450 and relation modeler 416 to store and access business object relation metadata in metadata repository 450. Generation API 422 enables a business object to communicate with generator 430 for code generation. Generator 430 includes a generator framework 432, a persistency generator 434, an EJB 436 generator, a UI adapter generator 438, a Web service generator 440, and a metadata API 442. Generator framework 432 can also be integrated into the Eclipse IDE.

To generate a business object, generator 430 can use templates in metadata repository 450 and code them with object metadata and relation metadata in the repository. Generator 430 can also generate the data persistency for the business object, and generate the actual business object, an EJB in this instance. Generator 430 can additionally generate user interfaces for the business object and any necessary Web services. The templates can be generic. In particular examples, the generators automatically create Java classes (e.g., for the implementation of the object access layer), JDO tables, EJBs, and configuration files, to adjust UI patterns to a certain business object, for example. Thus, the connectivity to back-end systems and the composite application persistency is generated as well as a default UI. Furthermore, UI adapters for a UI development and interface module and, if necessary, Web services can be generated. The output of such a process can be real working code in the object access layer of the run-time components. One particular example is the generation of a run-time implementation of a business object in an object access layer. The generator reads the business object metadata from the repository and generates the JDO persistency, the connectivity to the XI, the KW and/or the BW (e.g., by using proxies), the generic methods, and the basic UI for this coding, templates (e.g., for services) or XML-templates (e.g., for JDO persistency) are used where business object specific coding or XML is added, and the result is stored as complete code or complete XML.

Metadata repository 450 includes object metadata 452, relation metadata 454, and code generation templates 456. As mentioned previously, the information in object metadata 452 and relation metadata 454 can be used to code templates 456 to generate a business object.

There are a variety of types of methods that can be created for business objects. One example is lifecycle methods (e.g., create, update, etc.). Another example is methods that do not require coding. An example of such methods are those that allow business objects to participate in collaboration (e.g., subscribe, notify, discuss, etc.). These methods can be automatically called when a certain action is carried out (e.g., when a business object should be updated). In particular, these collaboration services can be specialized in accordance with a particular business object, as described above. Another type of method is one that is specific to the composite application. These methods can be directly called by the applications.

FIG. 5 illustrates components 700 for guided procedures for a composite application framework. A guided procedure is a series of steps, often involving human interaction, that should be performed during the execution of a composite application. A guided procedure is typically one that is common to a variety of applications. Components 700 can be classified into design time components 710 and run-time components 750, except for a metadata repository, which is part of both. Design-time components 710 can be used to generate run time components 750. Design-time components 710 include a modeler 720 and a generator 730. Modeler 720 includes a process modeler 722, a pattern modeler 725, and an action modeler 726.

Process modeler 722 includes a workflow modeler 723 and a context modeler 724. As their names imply, workflow modeler 723 allows process workflow for a guided procedure to be modeled, and context modeler 724 provides context definition. That is, context modeler 724 allows relations between other processes to be defined. As an example of this, an application can have more than one way of being activated, Intranet Web-based form versus remote voice control, for example. Context modeler is responsible for making sure that both activation mechanisms are associated with the application. In accordance with the context modeled by the context modeler 724, a specific collaboration service can be derived. Pattern modeler 725 provides workflow patterns (e.g., delegation and approval) for workflow modeler 723, and action modeler 726 provides actions for workflows. Modeler 720 also includes a metadata API 727, which provides access to the data in metadata repository 790. Thus, access to meta data regarding guided procedures is available. Generator 730 includes a template generator 731, a state chart generator 733, a pattern generator 735, an action generator 737, and a metadata API 739.

Templates describe a workflow that can be can be implemented using workflow patterns. Workflow patterns contain actions that must be accomplished to complete the workflow and, hence, part of the template. Thus, a pattern can be viewed as an abstraction of an action, and a template can be viewed as an abstraction of work flow pattern. For example, a template could describe a workflow for ordering a product, a computer, for example. The template can specify a workflow pattern for obtaining manager approval. The pattern would have certain actions that need to be undertaken. An example of an action could be finding the names of the employee's managers. The approval pattern, moreover, could be used for different templates. As their names imply, template generator 731 generates templates, state chart generator 733 generates state charts, pattern generator 735 generates patterns, and action generator 737 generates actions for the run-time environment. Metadata API 739 provides access to the metadata in metadata repository 790.

Metadata repository 790 includes templates 792, workflow patterns 794, actions 796, and metadata 798. The templates, patterns, actions, and metadata can be accessed by generator 730 to produce a guide procedure. Run-time components 750 provide instantiation for guided procedures, producing instances 752. Procedural navigation and integration can be provided in a Universal Worklist (UWL). Run-time components 750 also include object access services 760, context sharing service 762, content services 764, portal connector service 766, KM service 768, workflow service 770, and metadata services 772. Object access services 760 enables objects in an object access layer to be accessed. Context sharing service 762 provides context to a workflow. For example, when a user accesses a workflow, context sharing service 762 provides a link to the proper portions of the workflow. For instance, many workflows involve inboxes, where new tasks for the workflow can be sent. The inbox may provide a link to the proper portion of the workflow if the context is known.

Content services 764 provide services for executing functions based on generic calls. For example, a workflow can need an application, a composite application, an HRM application, or a CRM application, for example, to be initiated. By making a generic call to content services 764, the application can be initiated. Content service 764 can support integration with an application and/or a user interface. Portal connector service 766 provides a connection service to a portal. KM service 768 provides a connection service to a KM module. Workflow service 770 provides a connection service to an ad-hoc workflow. This workflow can be very user-centric, allowing the assignment of not only tasks handled by transactions in business systems, but also tasks that require user handling (e.g., compose e-mail). Metadata services 772 provides a connection to metadata repository 790.

Components 700 can have a variety of features. For example, the components can provide context mapping for building blocks, and a user profile can be automatically used and updated. In certain implementations, ad-hoc administrations of running workflows can be supported and guided procedures can be monitored and analyzed.

Figure 6:
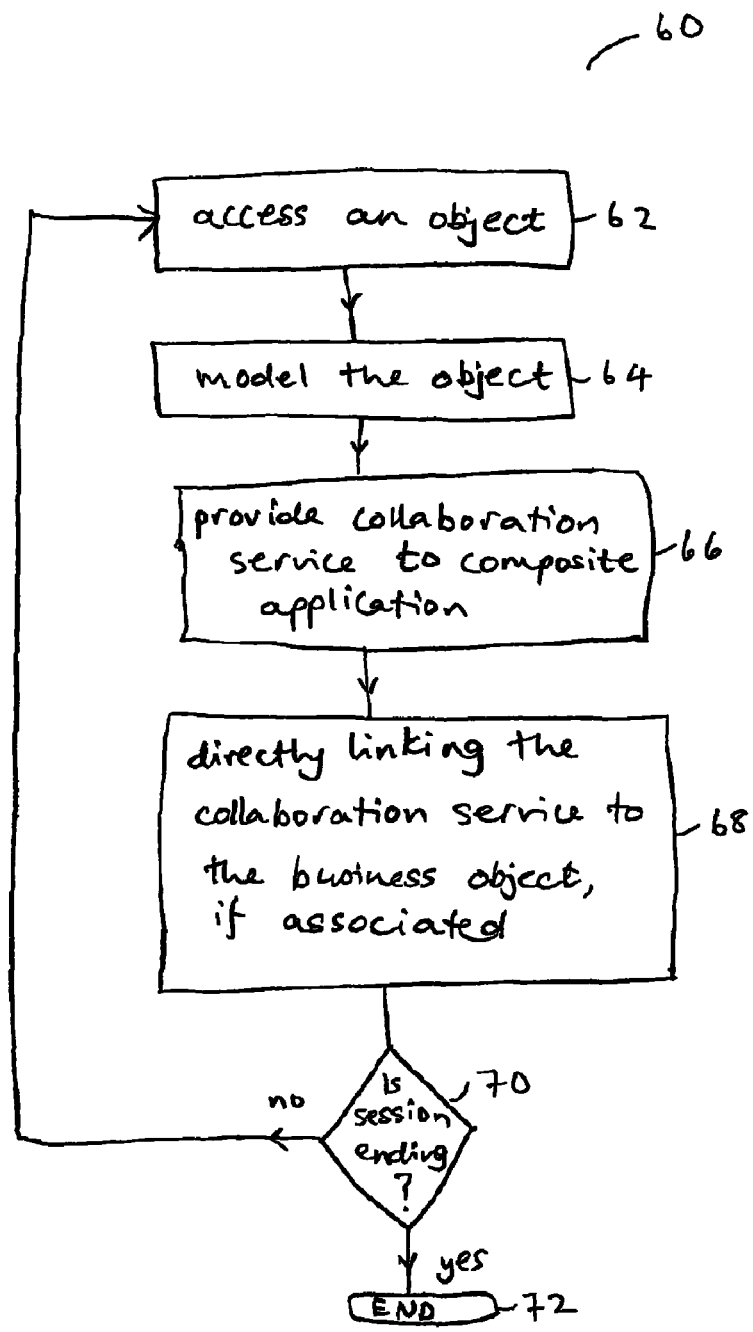
FIG. 6 is a flowchart of a process for implementing a composite application in a framework.

As shown in FIG. 6, a process 60 implements a composite application in a framework 200, 300 and includes accessing (62) an object to exchange data with a plurality of enterprise base systems and to present the data to a composite application through a uniform interface. Process 60 models (64) a business object to enable a UI for constructing a business object. Process 60 provide services to the composite application by providing (66) collaboration services to the composite application, wherein modeling (64) includes directly linking (68) at least one of the collaboration services associated with the business object to the business object. If the session is ending (70), process 60 ends (72). If the session is not ending, process 60 returns to accessing (62).

Providing the collaboration services can include providing at least one generic collaboration service. Modeling can include deriving at least one object specific service from the at least one generic collaboration service. Process 60 can include modeling a process, wherein modeling a process includes modeling a context, wherein modeling includes deriving an object specific service from the at least one generic collaboration service on the basis of the modeled context. Further, each business object can be a specific instance of an object class, wherein modeling step can include extending the object class by adding a generic collaboration service and deriving an object class specific service from the at least one generic collaboration service. In particular, the modeling can include specializing the at least one generic collaboration service in accordance with the object class. Further, modeling can be carried out by a design time component. Process 60 can include enabling a UI layer operable to enable UI patterns that facilitate information exchange between the composite application and a user.

Embodiments of the invention can be implemented in digital electronic circuitry, or in computer hardware, firmware, software, or in combinations of them. Embodiments of the invention can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps of embodiments of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

It is to be understood that the foregoing description is intended to illustrate and not to limit the scope of the invention, which is defined by the scope of the appended claims. Other embodiments are within the scope of the following claims.

What is claimed is:

1. An apparatus comprising:
a computer to provide a computer-implemented framework for a composite application, the computer-implemented framework comprising:
an object access layer to exchange data with enterprise base systems and to present the data to a composite application through a uniform interface;
a user interface (UI) layer to enable UI patterns that facilitate information exchange between the composite application and a user;
a business object modeling layer comprising a business object modeler to provide a user interface (UI) for constructing a business object; and
a service layer to enable services to the composite application, the service layer comprising a collaboration services module to enable collaboration services to the composite application, wherein the business object modeling layer directly links at least one of the collaboration services associated with the business object to the business object;
wherein the collaboration services module enables at least one generic collaboration service;
wherein the business object modeling layer that comprises the business object modeler to provide the user interface (UI) for constructing the business object comprises a module to derive at least one object specific service from the at least one generic collaboration service directly linked with the business object by the business object modeling layer; and
wherein the business object modeling layer that comprises the business object modeler to provide the user interface (UI) for constructing the business object is separate from the service layer that comprises the collaboration services module to enable collaboration services to the composite application.

2. The apparatus of claim 1 further comprising a process modeler including a context modeler for modeling a context, wherein the business object modeling layer comprises a module arranged to derive an object specific service from the at least one generic collaboration service on the basis of the modeled context.

3. The apparatus of claim 2 wherein each business object is a specific instance of an object class, and wherein the business object modeling layer comprises a module to extend the object class by adding a generic collaboration service and to derive an object class specific service from the at least one generic collaboration service.

4. The apparatus of claim 3 wherein the business object modeling layer specializes the at least one generic collaboration service in accordance with the object class.

5. The apparatus of claim 1 wherein the business object modeling layer is included in a design time component.

6. A computer-implemented method of implementing a composite application in a framework, the computer-implemented method comprising:
accessing, by a computer, an object to exchange data with enterprise base systems and to present the data to a composite application through a uniform interface;
enabling, by a computer, a UI layer to provide UI patterns that facilitate information exchange between the composite application and a user;
modeling, by a computer, a business object to enable a user interface (UI) for constructing a business object;
enabling, by a computer, services to the composite application including providing collaboration services to the composite application, wherein the modeling comprises directly linking at least one of the collaboration services associated with the business object to the business object;
wherein the providing the collaboration services comprises enabling at least one generic collaboration service;

wherein the modeling comprises:
deriving at least one object specific service from the at least one generic collaboration service; and
providing a business object modeling layer that comprises a business object modeler to provide the UI for constructing a business object; and
wherein the enabling services comprises:
providing a service layer that is to enable the services and is separate from the business object modeling layer.

7. The computer-implemented method of claim 6 further comprising modeling, by a computer, a context, wherein the modeling comprises deriving an object specific service from the at least one generic collaboration service on the basis of the modeled context.

8. The computer-implemented method of claim 7 wherein each business object is a specific instance of an object class, and wherein the modeling comprises extending the object class by adding a generic collaboration service and deriving an object class specific service from the at least one generic collaboration service.

9. The computer-implemented method of claim 8 wherein the modeling comprises specializing the at least one generic collaboration service in accordance with the object class.

10. The computer-implemented method of claim 9 wherein the modeling is carried out by a design time component.

11. A computer program product comprising a machine readable storage device having instructions executable by a computer to cause the computer to perform a method comprising:

accessing an object to exchange data with enterprise base systems and to present the data to a composite application through a uniform interface;
enabling a UI layer to provide UI patterns that facilitate information exchange between the composite application and a user;
modeling a business object to enable a user interface (UI) for constructing a business object;
enabling services to the composite application including providing collaboration services to the composite application, wherein the modeling comprises directly linking at least one of the collaboration services associated with the business object to the business object;
wherein the providing the collaboration services comprises enabling at least one generic collaboration service;
wherein the modeling comprises:
deriving at least one object specific service from the at least one generic collaboration service; and
providing a business object modeling layer that comprises a business object modeler to provide the UI for constructing a business object; and
wherein the enabling services comprises:
providing a service layer that is to enable the services and is separate from the business object modeling layer.

* * * * *